(12) United States Patent
Mazzonetto et al.

(10) Patent No.: US 7,270,224 B2
(45) Date of Patent: Sep. 18, 2007

(54) DEVICE FOR THE OPTIMIZATION OF HYDRAULICALLY CONTROLLED ENGAGEMENT OF CLUTCHES USED IN MARINE TRANSMISSIONS

(75) Inventors: Giampaolo Mazzonetto, Padova (IT); Paolo Cattapan, Padova (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 263 days.

(21) Appl. No.: 10/529,714

(22) PCT Filed: Sep. 26, 2003

(86) PCT No.: PCT/EP03/10759

§ 371 (c)(1),
(2), (4) Date: Mar. 29, 2005

(87) PCT Pub. No.: WO2004/031592

PCT Pub. Date: Apr. 15, 2004

(65) Prior Publication Data

US 2006/0006041 A1    Jan. 12, 2006

(30) Foreign Application Priority Data

Oct. 1, 2002   (IT) .......................... PD2002A0251

(51) Int. Cl.
*F15B 11/042* (2006.01)
*F16D 25/10* (2006.01)

(52) U.S. Cl. ................... 192/87.13; 192/51; 192/109 F

(58) Field of Classification Search ............. 192/87.13, 192/109 F
See application file for complete search history.

(56) References Cited

U.S. PATENT DOCUMENTS

| | | | | |
|---|---|---|---|---|
| 3,823,801 | A * | 7/1974 | Arnold | .................... 192/87.19 |
| 4,086,994 | A | 5/1978 | Hirosawa et al. | |
| 4,451,238 | A * | 5/1984 | Arnold | ........................ 440/75 |
| 4,690,261 | A * | 9/1987 | Peter et al. | .............. 192/87.13 |
| 5,902,344 | A | 5/1999 | Eike et al. | |
| 6,761,600 | B2 * | 7/2004 | Daus et al. | .................... 440/75 |

FOREIGN PATENT DOCUMENTS

| | | |
|---|---|---|
| FR | 1440115 | 4/1966 |
| GB | 2 106 610 A | 4/1983 |
| JP | 61241532 A * | 10/1986 |

* cited by examiner

*Primary Examiner*—Richard M Lorence
(74) *Attorney, Agent, or Firm*—Davis Bujold & Daniels, P.L.L.C.

(57) ABSTRACT

Optimization of hydraulically controlled engagement of clutches in marine transmissions by a device having two clutch control pistons, two solenoid valves arranged between the pumps, aid pistons, a bistable valve connected between the solenoid valves and pistons, a control valve arranged on a discharge line leading to a reservoir and-an adjusting device with a spring element is linked to the bistable valve. A shuttle-type sequence valve links the spring element and a solenoid and bistable valve supply line. The-bistable valve is linked to the hydraulic control of the sequence valve to produce a preset pressure drop between the spring element (18) and the pressure side of pumps.

3 Claims, 5 Drawing Sheets

DEVICE FOR THE OPTIMIZATION OF HYDRAULICALLY CONTROLLED ENGAGEMENT OF CLUTCHES USED IN MARINE TRANSMISSIONS

This application is a national stage completion of PCT/EP2003/010759 filed Sep. 26, 2003 which claims priority for Italian Application Serial No. PD2002A251 filed Oct. 1, 2005.

FILED OF THE INVENTION

As is known, structural design of a marine transmission—reference is made to FIG. 1 of attached sketches—includes presentation of clutch A as a subassembly installed in housing B, which is arranged between engine C (power generator) and the propeller axle D (power consumer).

BACKGROUND OF THE INVENTION

Clutch A comprises in particular:
A drive shaft E on which the individual components of the rotating clutch A are supported.
A bell F, which is firmly linked to the drive shaft E and the engine C and which also constitutes the support for the control piston L.
A disk carrier pinion H opposite the drive shaft E and freely rotating on bearings for transmission of the motion of the propeller axle D.
Clutch disks A1, whose rotational movement is guided by the bell F.
Driven clutch disks A2 arranged alternately with disks A1 and constituting the clutch package.
The control piston L (ring with hydraulic sealing on outer diameter to establish sealing towards the cylinder and hydraulic sealing on inner diameter to establish sealing towards the drive shaft), which is arranged opposite the counter disk 1, which cancels the assembly clearance between disks A1 and the counter disks A2 as soon as it starts moving through the agency of the hydraulic oil.
A return spring G (spring(s) capable of restoring the assembly clearance between the disks and counter disks), which makes sure that the piston L returns into the cylinder if hydraulic pressure is not available.

If disks A1 and counter disks A2 are pressed against the spring-cushioned counter disk 1, then piston L will put the disk carrier pinion H, which is linked to the propeller axle D, in a rotational motion synchronous with that of the bell F, which is linked to the engine axle C, and will thus neutralize the relative rotation between disks A1 and the counter disks A2, a condition which is typical for "idling" (propeller axle D is disconnected from the engine axle).

The assembly clearance, which is equivalent to the distance covered by the piston L between its end positions, is referred to as "approximation distance" and determines (together with the area of the rim of piston L) the "approximation displacement". The time needed to cover the approximation distance is referred to as approximation time.

Such a clutch can adopt two conditions:

a) Open: Piston L is pressed to its stop by the return spring(s) G (pos. 1 in FIG. 2) in bell F. The distance between disks A1 and counter disks A2 (assembly clearance) and the presence of lubricating oil permit their rotation relative to each other without influencing each other (in this condition, the engine axle C can rotate while the propeller axle D is stationary, and vice versa).

b) Closed: Piston L is pressed against the clutch package by the hydraulic fluid (pos. 2 in FIG. 2). The distance between disks A1 and counter disks A2 (assembly clearance) is fully canceled. The presence of abrasion particles between disks A1 and counter disks A2, which are pressed together by the pressure effected by the piston L, which is proportional to the control pressure, causes their firm coupling and thus allows the flow of power between engine axle C and propeller axle D (in this condition, the propeller axle D can only run concurrent with the engine axle C, provided that sufficient thrust is generated by the control pressure).

According to the present state of the art—with particular reference to FIG. 3 of attached sketches—a hydraulic system for a marine reversing gear that does not feature electronic test equipment comprises a pump M to deliver hydraulic fluid from a reservoir N to the control pistons L1 and L2, i.e. one piston for each clutch (forward and reverse gear), two shuttle-type solenoid valves O and P arranged between pump M and piston L1 or piston L2, with one of them taking care of forward drive or discharge to the reservoir N and the other one taking care of reversing or discharge to the reservoir N, a bistable valve Q arranged in between the solenoid valves O and P and piston L, a control valve R arranged on the pressure side of pump M towards the discharge line to the reservoir N and provided with an adjusting device S, whose spring element T is linked to the bistable valve Q.

For smooth, jerk-free initiation of power transmission between engine C and propeller axle D, the above described device—at the end of the approximation distance (cf. functional diagram of FIG. 4 showing pressure in relation to time)—slowly and continuously elevates the pressure to a maximum level, starting from a level slightly above the max. level required for displacement of the piston L against the spring G.

The approximation phase starts at point 1 of the diagram; it ends at point 2.

The ability to transmit clutch power is proportional to the pressure supply of the pressure chamber, i.e. the volume available between bell F, drive shaft E and piston L.

This pressure also determines actuation times. If during the approximation phase a pressure level equivalent to that of the return spring G is reached, this will cause the piston L to remain in a state of equilibrium—its approximation speed will therefore be 0 while its approximation time becomes infinite. On the other hand, if pressure reaches a "very high" level, the actuation time can drop to a minimum value.

Hobby skippers generally believe that the response time of a boat to course change commands should be reduced as much as possible. The ideal response time would be 0.

The clutch contributes to the response time, but it is not the only component on which response time depends. Ergonomics of control and the integrity of the engine/propeller drive train prohibit influencing ramp time and force us to influence the approximation time. A number of solutions are available for this: Optimization/enlargement of the cross-section of lines leading from the pump M to the clutch; use of a different oil grade with different physical properties; modification of the delivery volume during the approximation phase; modification of the "displacement" of the clutch (either by reducing the cross-section of the piston in favor of a proportional increase in operating pressure or by reducing the assembly clearance of the clutch package); splitting of clutch "displacement" into two sections (a first one with a smaller cross-section for a faster acceleration phase and a second one with a cross-section equivalent to the rated cross-section); elevation of the minimum pressure level (in a traditional actuation system this reduces approximation time but increases the likelihood for jerks within the drive train during the actuation phase); use of the ECU together with the proportional solenoid vales O and P.

All these solutions—which can also be combined—have their limitations, due to the high expenses involved, but also because of the fact that they require the application of use specific solutions and the resulting difficulties involved in precise, detailed adjustment.

SUMMARY OF THE INVENTION

The main object of the present invention is to use a simple but at the same time extremely efficient approach to produce a device that permits optimization of hydraulically controlled engagement of clutches used in marine transmissions and also allows the approximation time to be reduced, by means of which above problems can be counteracted. With regard to this main object, one purpose of the present invention is to produce a device capable of automatic auto-control as far as certain functional or operational parameters (e.g. operating temperature and delivery volume, which can vary in relation to the rotation speed of the pump) are concerned.

These objectives and other ones to be detailed in the following can be achieved by means of a device for the optimization of hydraulically controlled engagement of clutches used in marine transmissions and comprising pumps for delivering hydraulic fluid to two control pistons of said clutches, two solenoid valves arranged between said pumps and said pistons, a bistable valve arranged in between said solenoid valves and said pistons, a control valve arranged on the pressure side of said pumps towards the discharge line leading to the reservoir and equipped with an adjusting device, whose spring element is linked to said bistable valve, whereby said device for the optimization of engagement is characterized in that it comprises a shuttle-type sequence valve for the link between the spring element of said adjusting device and the supply line of said solenoid valves or said bistable sequence valve, whereby the bistable valve is also linked to the hydraulic control of said sequence valve, and whereby a preset pressure drop is produced between the spring element of said adjusting device and said bistable valve, and said adjusting device is linked to the pressure side of said pumps.

BRIEF DESCRIPTION OF THE DRAWINGS

The invention will now be described, by way of example, with reference to the accompanying drawings in which.

DETAILED DESCRIPTION OF THE INVENTION

Figure 1:
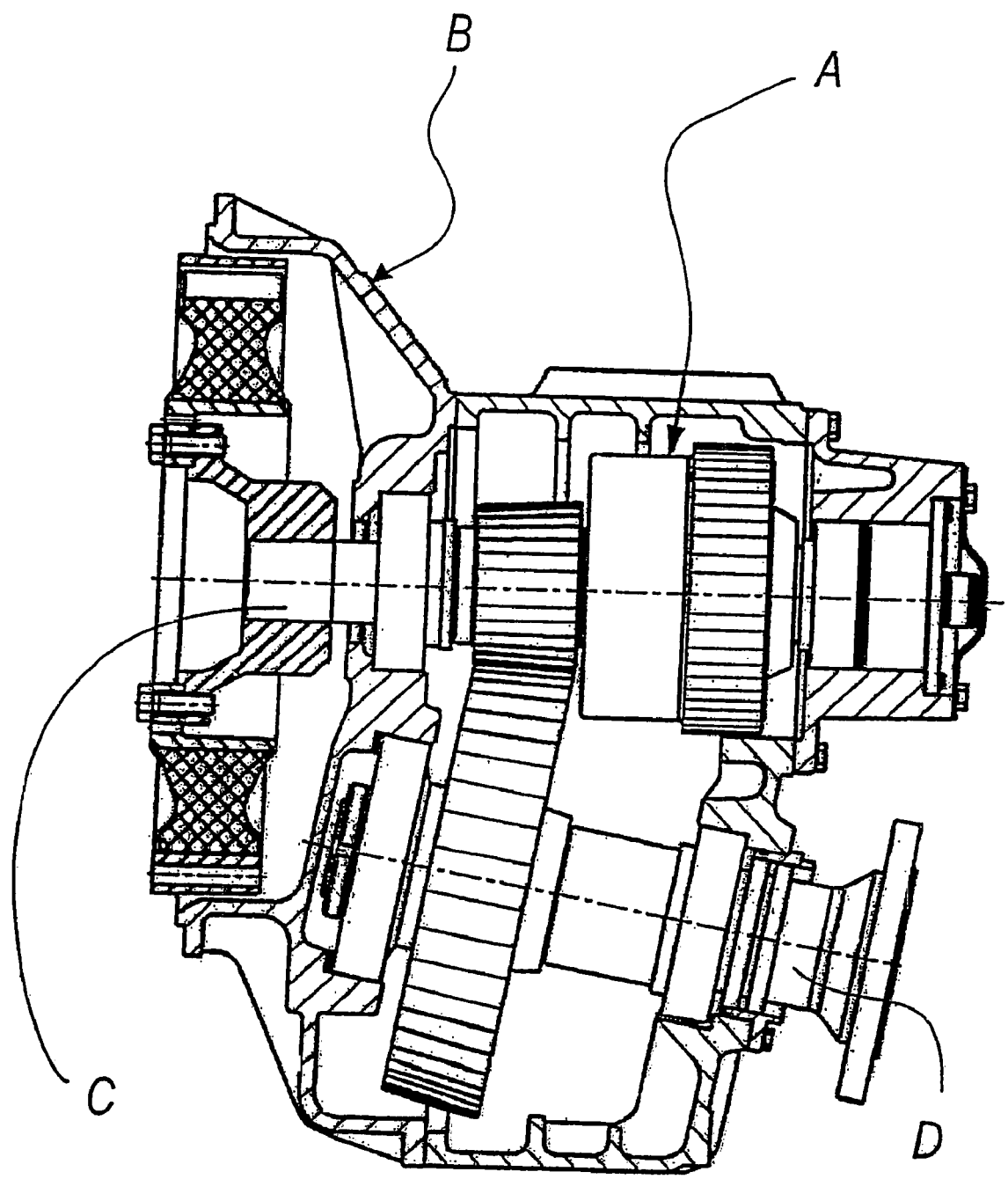
FIG. 1 is a diagram of a known marine transmission.
Figure 2:
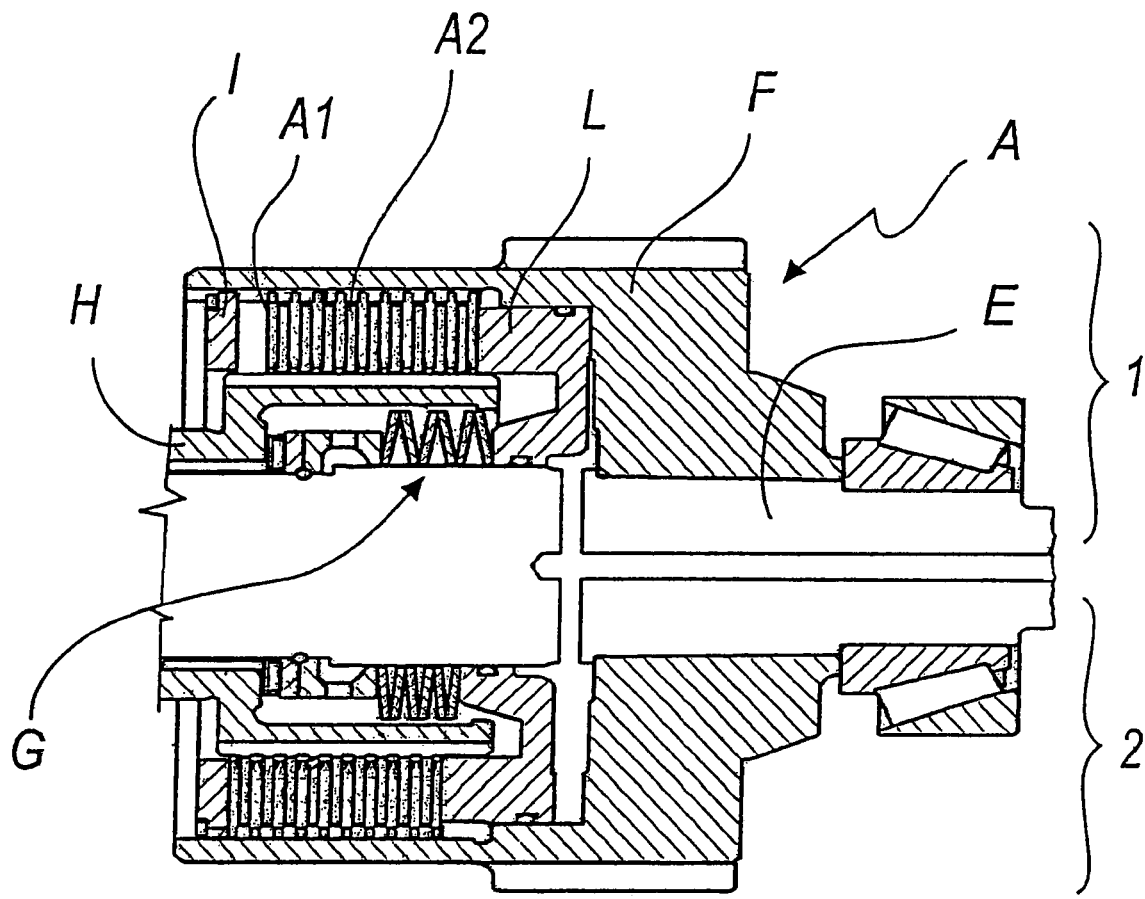
FIG. 2 is a sectional view of the clutch of the transmission from FIG. 1.
Figure 3:
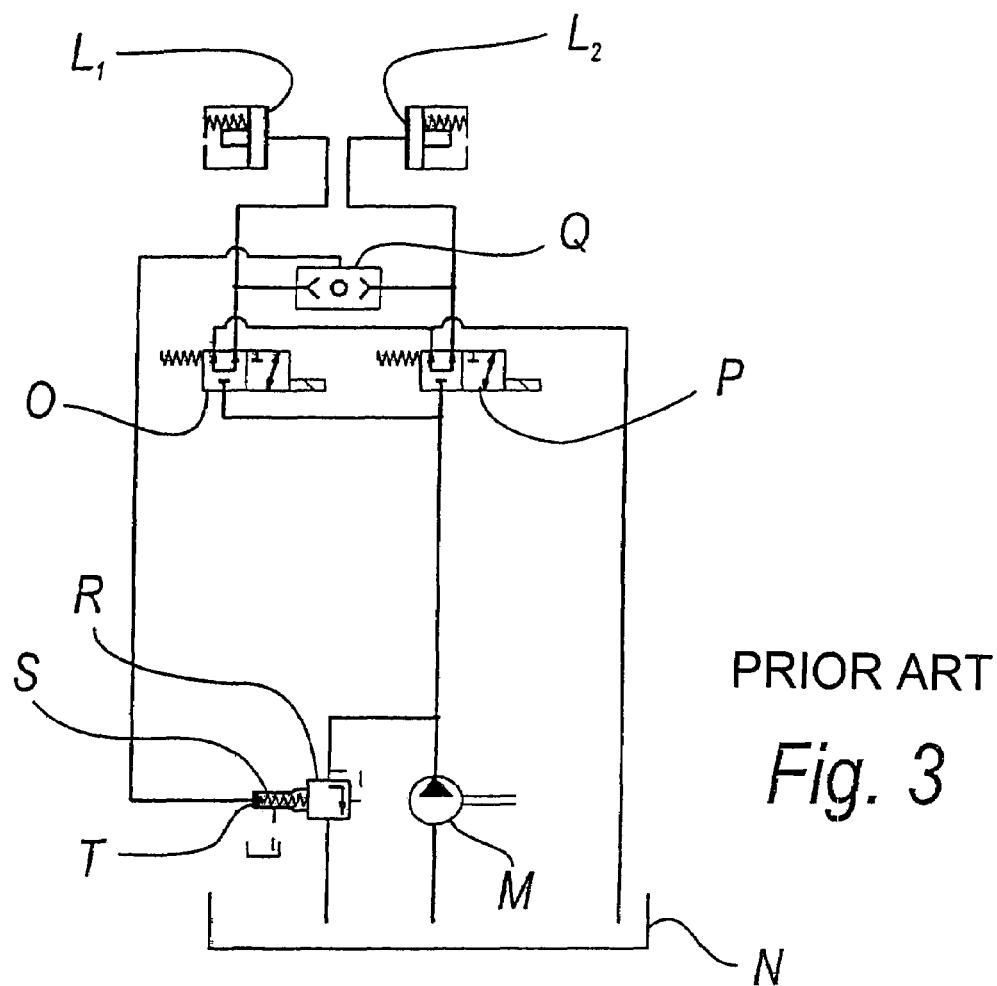
FIG. 3 is a hydraulic diagram of a known clutch engagement device for the clutch from FIG. 1.

With reference to above mentioned illustrations (FIG. 5 to FIG. 7), a device for the optimization of hydraulically controlled engagement of clutches used in marine transmissions comprises a pump 10 for delivering hydraulic fluid from a reservoir 11 to two control pistons 12a and 12b of said clutches—one for forward drive and one for reverse drive control.

Two solenoid valves (13/14) arranged between the pump 10 and between the piston 12a or 12b, the selector valve 13 for forward drive and the discharge into the reservoir 11 and the selector valve 14 for reverse drive and the discharge into the reservoir 11.

A bistable valve 15 is arranged in between the solenoid valves 13 and 14 and the pistons 12a and 12b; and a control valve 16 is provided on the pressure side of the pump 10 toward the discharge into the reservoir 11 and provided with an adjusting device 17, whose spring element 18 is linked to the bistable valve 15.

According to the invention, the device for engagement optimization is characterized in that is comprises a shuttle-type sequence valve 19 on the link between the spring element 18 and the adjusting device 17 and the supply of the solenoid valves 13 and 14 or the bistable valve 15. The bistable valve is also linked to the hydraulic control 20 of the sequence valve 19.

A preset pressure drop is produced between the spring element 18 of the adjusting device 17 and the bistable valve 15, and the adjusting device 17 is linked to the pressure side of the pump 10.

It is of advantage that the preset pressure drop produces a throttling effect, which can be brought about functionally or by means of a suitable valve 21 or by means of suitable design of the lines, whereby theses lines cause an equivalent pressure drop.

Figure 6:
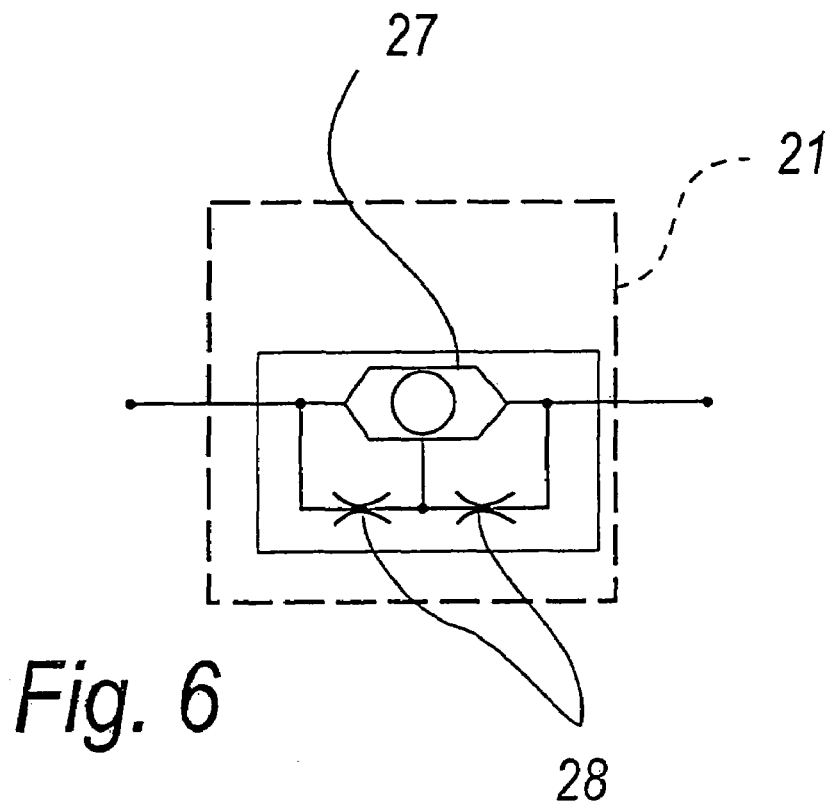
FIG. 6 is as diagram of an implementation of one of the components of the device from FIG. 5.

As for valve 21 (a function example of which is shown in FIG. 6 and which constitutes a check valve with hydraulic control for both directions of flow), which is connected in parallel with a throttle valve 28, this can be integrated at will in any section of the circuit marked with 22 (between the sequence valve 19 and the bistable valve 15) or marked with 23 (between the sequence valve 19 and the spring element 18 of the adjusting device 17).

Figure 5:
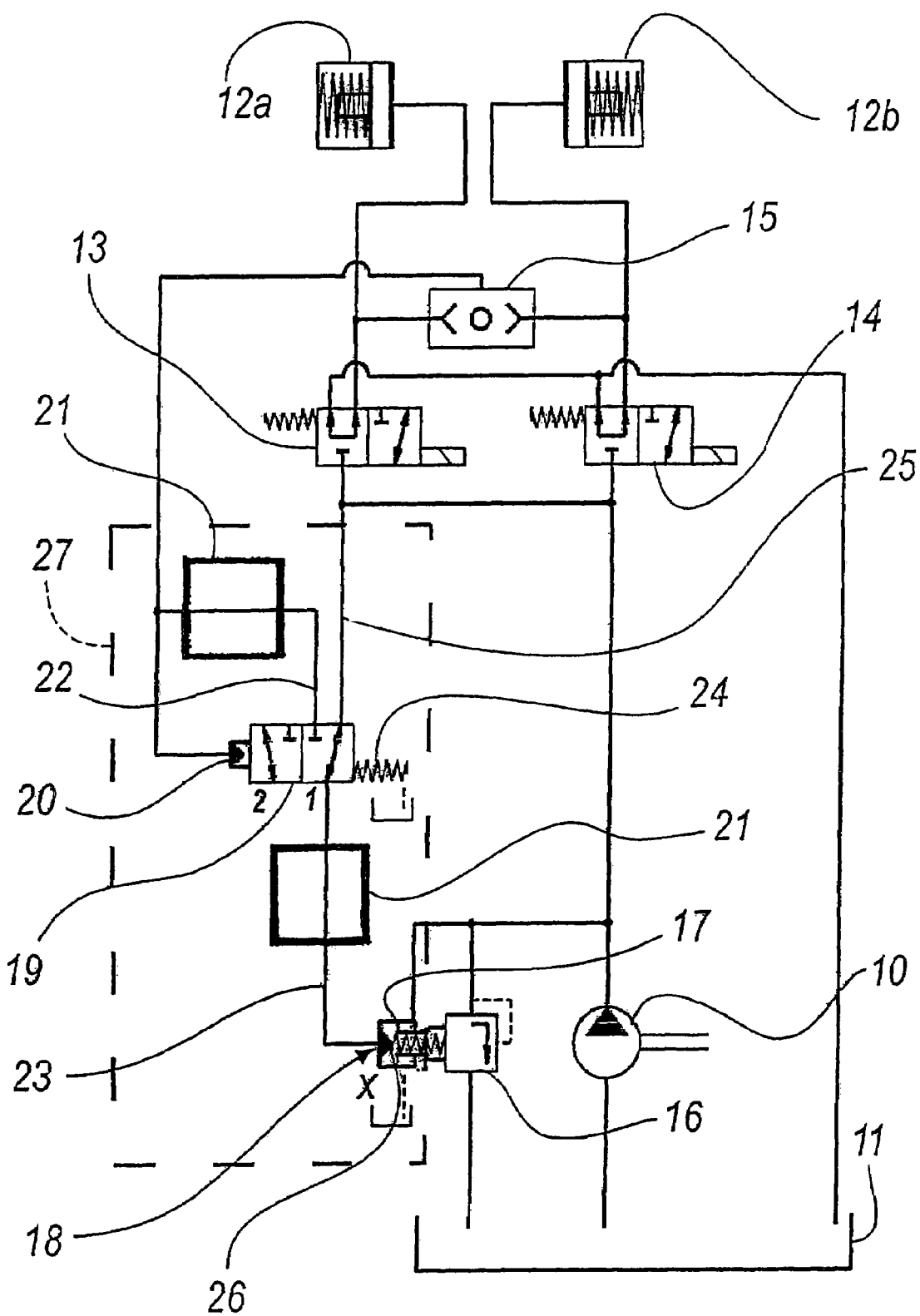
FIG. 5 is a hydraulic diagram according to the present invention.

As for function, the sequence valve 19 in the condition as shown in FIG. 5 is held in position (1) by the spring 24, and the adjusting device 17 is thus provided with the pressure present before the solenoid valves 13 and 14 via the lines 25 and 23.

Consequently, a raised level of operational nominal pressure is available. In idle condition, the bistable valve 15 is linked via line 22 with valve 21 and the hydraulic control 20 of the sequence valve 19, whereby a discharge line to the reservoir 11 is created.

If activation of one of the solenoid valves 13 or 14 is requested, then the bistable valve 15 will supply the control 20 of the sequence valve 19 via the pressure level present in the supply line of the clutch being controlled.

The sequence valve 19 thus changes to position (2). In the control phase the adjusting device 17 starts discharging some of the oil via the lines 22, 23 and valve 21 toward the clutch.

In this phase, the pressure controlled by the control valve 16 drops from the operational nominal value to the minimum value. When the approximate value is reached, a state of equilibrium is established between the pressure on the link 23 to the adjusting device 17 and the pressure on the link 22 to the bistable valve, whereby piston 26 inside the control valve 16 is in fully retreated position (position x). The pressure available is equivalent to the minimum pressure.

Consequently, identical standard functional conditions are present at the onset of the engagement phase of the clutches. Hereby, the direction of flow of the oil passing through vale 21 is reversed and the oil from the bistable valve 15 feeds the adjusting device 17, which (precisely as described before) permits a constant increase in the pressure level within the circuit. This allows smooth and progressive engagement of the clutch.

An outstanding feature of the device is its auto-control capability with regard to preset operating or functional parameters (e.g. operating temperature and delivery volume, which can vary in relation to the rotation speed of the pump 10) which affect pressure drops in the section after the control valve 16 and before the solenoid valves 13 and 14.

In the present design, this capability is realized by means of a suitable design of the piston of valve 16 in the form of several diameters. Introduction of a test valve 27 (together with the sequence valve 19 and valve 21, which corresponds to a throttle), which during the approximation phase provides a pressure level above the minimum pressure level and equivalent to the minimum level at the end of the approximation phase and which monitors the subsequent ramp, makes it possible to counteract the problems encountered by means of a simple and at the same time extremely efficient solution.

Figure 7:
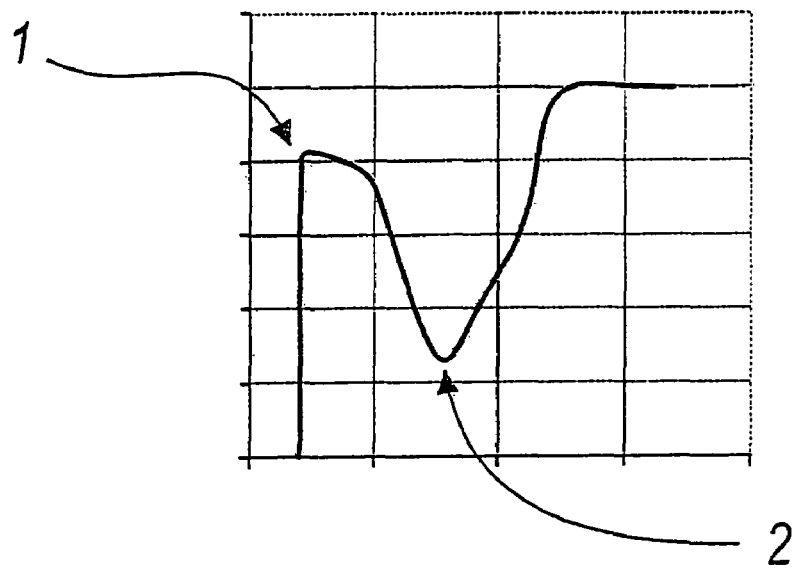
FIG. 7 is a functional diagram of the device from FIG. 5, in which the pressure curve is shown in relation to the time.

With reference to the diagram from FIG. 7, the test valve 27 in practical application uses the following parameters (in terms of pressure values):

pressure in the pump 10;
pressure before the solenoid valves 13 and 14;
pressure after the solenoid valves 13 and 14;

and via the control of the control valve 16 provides a pressure level (on the solenoid valves 13 and 14 and thus on the associated piston 12a and 12b) which constantly drops, starting at the onset of the approximation phase (point 1 of the diagram) and until the minimum pressure level is reached at the end of the approximation phase (point 2 of the diagram).

Figure 4:
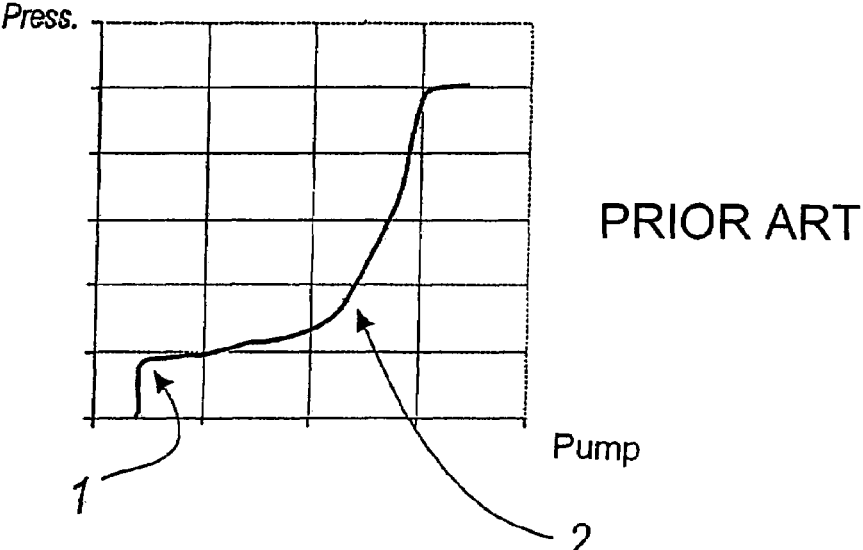
FIG. 4 is a functional diagram of the device from FIG. 3, in which the pressure curve is shown in relation to the time.

Comparison of the diagram from FIG. 4 with the known devices shows that the referenced point 2 is reached at an earlier time compared to the corresponding point 2. As already explained, this pressure increase permits reduction of the approximation time. In this point, valve 27 permits initiation of the preset standard ramp. Introduction of valve 27 combined with control valve 16 permits neutralization of the effects of changes of temperature and oil flow rate (versus the approximation time) by means of an automatic control mechanism. The principles of ergonomics of clutch actuation are not affected.

The method reverses the previous concept, since the control phase starts under operational pressure, the minimum pressure level is reached at the end of the piston travel of piston 12a or 12b (approximation point), and subsequently the capacity is increased to transmit a gradual elevation in pressure until the operational pressure has been restored.

Practical application has shown how the present invention permits a satisfactory solution to be found for the main objective and for the targets set to achieve this objective.

The invention can be subjected to a variety of modifications; they are, however, all within the conceptual framework of the invention.

Moreover, all single parts can be exchanged with equivalent technical components.

The materials used can be freely chosen according to requirements, provided they conform to the specified application and dimensions.

The invention claimed is:

1. A device for the optimization of hydraulically controlled engagement of marine transmission clutches comprising a pump (10) for delivery of hydraulic fluid from a reservoir (11) to two control pistons (12a, 12b) of said clutches, two solenoid valves (13, 14) arranged between said pump (10) and said pistons (12a, 12b) with a first output of each solenoid valve (13, 14) being connected to an input of a corresponding one of the two control pistons (12a, 12b) bistable valve (15) having first and second ports with each of the first and second ports being connected to a corresponding one of the first outputs of the solenoid valves (13, 14), a control valve (16) arranged on a pressure side of said pump (10) toward a discharge line leading to the reservoir (11) and equipped with an adjusting device (17), comprising a spring element (18) that is linked to said bistable valve (15), the optimization device further comprising a shuttle-type sequence valve (19) on a link between the spring element (18) of said adjusting device (17) and one of a supply line of said solenoid valves (13, 14) or said bistable valve (15), the bistable valve (15) is also linked to a hydraulic control (20) of said sequence valve (19), said adjusting device (17) is linked to the pressure side of said pump (10), and a valve (21) arranged in a selected section of the link (22) between said sequence valve (19) and said bistable valve (15) or the link (23) between the sequence valve (19) and said spring element (18) of said adjusting device (17), a function of this valve (21) is to produce a preset pressure drop between the spring element (18) of said adjusting device (17) and the bistable valve (15).

2. A device for the optimization of hydraulically controlled engagement of marine transmission clutches comprising a pump (10) for a delivery of hydraulic fluid from a reservoir (11) to two control pistons (12a, 12b) of said clutches, two solenoid valves (13, 14) arranged between said pump (10) and said pistons (12a, 12b) with a first output of each solenoid valve (13, 14) being connected to an input of a corresponding one of the two control pistons (12a, 12b), a bistable valve (15) having first and second ports with each of the first and second ports being connected to a corresponding one of the first outputs of the solenoid valves (13, 14), a control valve (16) arranged on a pressure side of said pump (10) toward a discharge line leading to the reservoir (11) and equipped with an adjusting device (17), comprising a spring element (18), that is linked to said bistable valve (15), the optimization device further comprises a shuttle-type sequence valve (19) between the spring element (18) of said adjusting device (17) and one of a supply line of said two solenoid valves (13, 14) or said bistable valve (15), the bistable valve (15) is also linked to a hydraulic control (20) of said sequence valve (19), said adjusting device (17) is linked to the pressure side of said pump (10) through which a throttling effect is made possible, a function of the lines is to produce a preset pressure drop between the spring element (18) of said adjusting device (17) and the bistable valve (15).

3. The device according to claim 1, wherein the preset pressure drop is produced by way of a lines, through which a throttling effect is possible.

* * * * *